(12) United States Patent
Werjefelt

(10) Patent No.: US 12,545,413 B2
(45) Date of Patent: Feb. 10, 2026

(54) EMERGENCY VISION ASSURANCE SYSTEM DEVICE WITH WRAPPER ACTIVATED SWITCH AND A VOLUME-EXPANDING, OPENING-ENLARGING HOUSING

(71) Applicant: Christian Werjefelt, Kaneohe, HI (US)

(72) Inventor: Christian Werjefelt, Kaneohe, HI (US)

(73) Assignee: VISIONSAFE, LLC, Kaneohe, HI (US)

( * ) Notice: Subject to any disclaimer, the term of this patent is extended or adjusted under 35 U.S.C. 154(b) by 0 days.

(21) Appl. No.: 18/431,354

(22) Filed: Feb. 2, 2024

(65) Prior Publication Data

US 2024/0270392 A1 Aug. 15, 2024

Related U.S. Application Data

(60) Provisional application No. 63/463,717, filed on May 3, 2023, provisional application No. 63/444,304, filed on Feb. 9, 2023.

(51) Int. Cl.
*B64D 25/00* (2006.01)

(52) U.S. Cl.
CPC .................. *B64D 25/00* (2013.01)

(58) Field of Classification Search
CPC ..................................... B64D 25/00
See application file for complete search history.

(56) References Cited

U.S. PATENT DOCUMENTS

| 3,602,463 | A | * | 8/1971 | Koochembere | B63C 9/23 244/148 |
|---|---|---|---|---|---|
| 4,832,287 | A | * | 5/1989 | Werjefelt | B64D 11/00 280/732 |
| 5,202,796 | A | * | 4/1993 | Werjefelt | A62B 3/00 359/894 |
| 5,318,250 | A | * | 6/1994 | Werjefelt | B64D 10/00 244/118.5 |
| 5,947,415 | A | * | 9/1999 | Werjefelt | A62B 99/00 244/121 |
| 6,460,804 | B2 | * | 10/2002 | Werjefelt | B64C 1/1476 359/896 |
| 7,583,455 | B2 | * | 9/2009 | Werjefelt | G02B 27/04 359/894 |

(Continued)

OTHER PUBLICATIONS

PCT Notification of Transmittal of the International Search Report and the Written Opinion of the International Searching Authority PCT/US24/14279 dated Jul. 11, 2024.

*Primary Examiner* — Joshua J Michener
*Assistant Examiner* — Michael B. Kreiner
(74) *Attorney, Agent, or Firm* — FRESH IP PLC

(57) ABSTRACT

An emergency vision assurance system device includes a housing; an inflatable enclosure having an inflated state and a deflated state, the main enclosure in the deflated state being disposed in the housing; a blower disposed in the housing; a hose with a first end attached to the blower and second end attached to the enclosure; and a switch disposed at the second end for operating the blower. The emergency vision assurance system device also includes a housing with an opening for access to the inflatable enclosure, the opening having a smaller opening when closed and a larger opening when open; and a cover for closing the opening.

25 Claims, 6 Drawing Sheets

(56) References Cited

U.S. PATENT DOCUMENTS

| | | | | |
|---|---|---|---|---|
| 8,453,969 B2* | 6/2013 | Werjefelt | ............... | B64D 43/00 |
| | | | | 280/728.1 |
| 8,888,042 B2* | 11/2014 | Werjefelt | ............... | B64D 25/00 |
| | | | | 244/121 |
| 9,193,477 B2* | 11/2015 | Werjefelt | ............... | B64D 45/00 |
| 10,215,991 B2* | 2/2019 | Werjefelt | ............... | G02B 23/00 |
| 10,906,655 B2* | 2/2021 | Parker | .................... | B64D 25/00 |
| 12,097,964 B2* | 9/2024 | Werjefelt | ............... | B64C 27/006 |
| 2011/0019297 A1* | 1/2011 | Werjefelt | ............... | G02B 23/20 |
| | | | | 359/894 |
| 2012/0325961 A1 | 12/2012 | Werjefelt | | |
| 2013/0308260 A1* | 11/2013 | Stevenson | ............... | G02B 23/20 |
| | | | | 361/679.01 |
| 2019/0061949 A1* | 2/2019 | Potet | ..................... | A62B 18/02 |
| 2019/0106219 A1* | 4/2019 | Parker | .................... | B64D 43/00 |

\* cited by examiner

EMERGENCY VISION ASSURANCE SYSTEM DEVICE WITH WRAPPER ACTIVATED SWITCH AND A VOLUME-EXPANDING, OPENING-ENLARGING HOUSING

FIELD OF THE INVENTION

The present invention is generally directed to a device to enable an operator to maintain visual contact with instruments or other visual sources of data after smoke and/or particulate from a fire or other sources has invaded the operator's environment.

BACKGROUND OF THE INVENTION

When cockpits are invaded by continuous, dense, blinding smoke that turns airplanes into unguided missiles, the results are well known to be catastrophic and fatal for passengers and crew. None creates an unsafe condition faster than a pilot blinded by continuous, opaque smoke. And none occurs as frequently as smoke in the cockpit. According to the Air Line Pilots Association, airliners make an unscheduled or emergency landing due to smoke in the cockpit on an average of once per day.

What is true for a cockpit is equally true for any operator station where the operator's ability to see the instrument panel when smoke invades the operator's station depends on the safe operation or orderly shutdown of critical processes, such as occur in a nuclear power station, submarine, and similar operator stations.

Emergency vision devices for aiding pilots to see through vision-impairing smoke to maintain their visual access to critical information, such as that provided by an instrument panel and visual information available outside the cockpit to help pilots safely guide their aircrafts are disclosed in U.S. Pat. Nos. 4,832,287; 5, 318,250; 5,202, 796; 5, 947, 415, 6,460,804; 7,583,455 and 10,906,655.

SUMMARY OF THE INVENTION

The present invention provides an emergency vision system, comprising a housing; an inflatable enclosure having an inflated state and a deflated state, the inflatable enclosure in the deflated state being disposed in the housing; a blower disposed in the housing; a hose with a first end attached to the blower and second end attached to the inflatable enclosure; and a switch disposed at the second end for operating the blower.

The present invention also provides an emergency vision system, comprising a housing; an inflatable enclosure having an inflated state and a deflated state, the inflatable enclosure in the deflated state being disposed in the housing; the housing including an opening for access to the inflatable enclosure; the opening having a smaller opening when closed and a larger opening when open; and a cover for closing the opening.

DETAILED DESCRIPTION OF THE INVENTION

Figure 1:
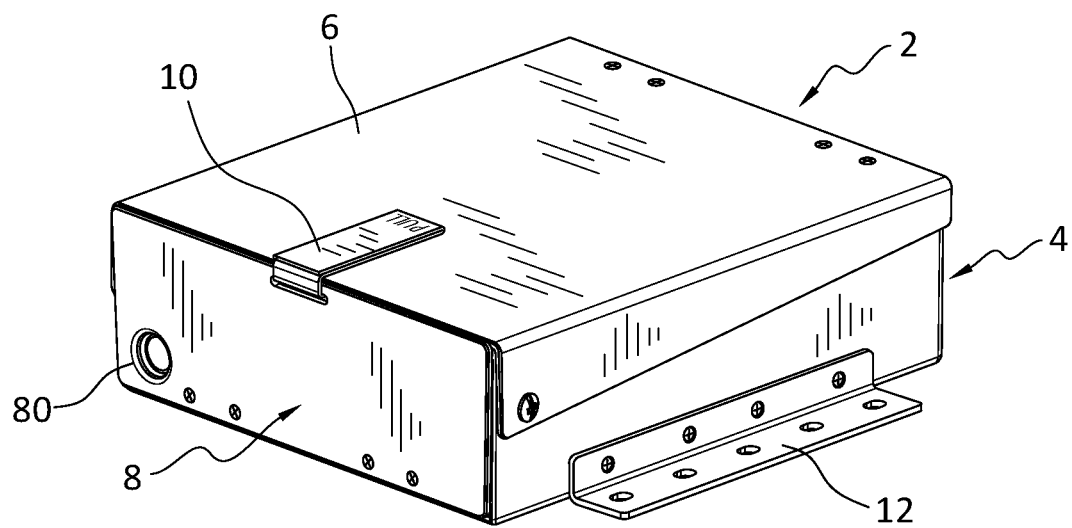
FIG. 1 is a perspective view of a housing for an emergency vision assurance system (EVAS) device embodying the present invention.

Referring to FIG. 1, an emergency vision assurance system (EVAS) device 2 embodying the present invention is disclosed. The EVAS device 2 includes a housing 4, generally box-shaped, with a front wall 6 and a cover 8. A strap 10 is attached to the cover and removably attached to the front wall 6 with a VELCRO fastener or other standard fasteners. Brackets 12 may be attached to the housing 2 for mounting the EVAS device 2 on a wall of an aircraft cockpit.

Figure 2:
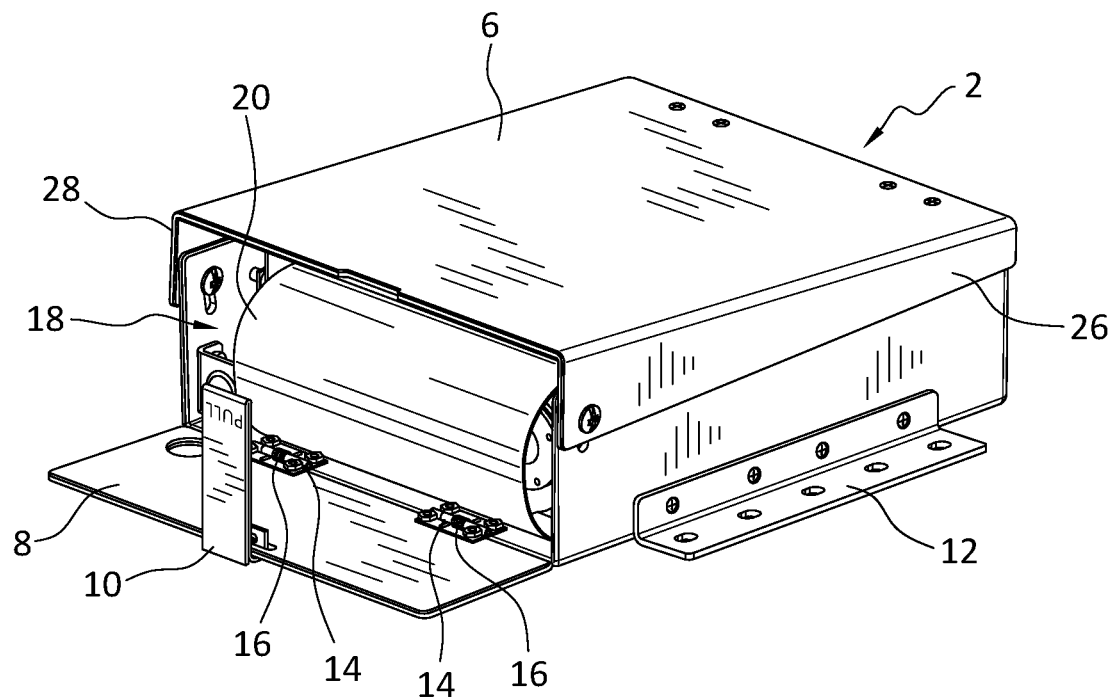
FIG. 2 is a perspective view of the housing of the EVAS device with the cover opened to show the deflated inflatable vision unit inside.

Referring to FIG. 2, the cover 8 includes hinges 14 attached to the housing 4. The hinges may include springs 16 biased to lift and move the cover 8 clear of an opening 18 of the housing 4. The opening 18 provides access to an inflatable vision unit 20, which is stored inside the housing 4 while not deployed. The opening 18 has a smaller opening when the cover 8 is closed and the strap 10 is attached to the housing 4, as shown in FIG. 1, and a larger or wider opening when the strap 10 is released from the housing. The volume of the housing 4 advantageously expands when the cover 8 is released from the opening 18. The expandable volume advantageously facilitates the packing of the hose 48 and the inflatable vision unit 20 into the housing during assembly or after maintenance. The cover 8 advantageously restrains the front wall 6 from expanding the housing when the strap 10 is attached to the housing 4 to close the opening 18. The opening 18 advantageously becomes larger in width when the strap 10 is detached from the housing 4. The larger or wider opening and the expansion of the housing 4 advantageously provide additional room for the user's hand to reach in and pull the inflatable vision unit 20 inflatable enclosure 6 out of the housing 4 for deployment. Although the cover 8 is shown opened to a 90° position in FIG. 2, the cover 8 may be rotated further than the 90° arc. The cover 8 may open automatically when released by the strap 10 due to the action of the springs 16.

Although the entire front wall 6 is hinged to enlarge the opening 18 when opened, the same result of enlarging the opening may also be accomplished by hinging only a portion of the wall 6 next to the opening 18, while keeping the rest of the wall 6 fixed to the housing 4.

Figure 3:
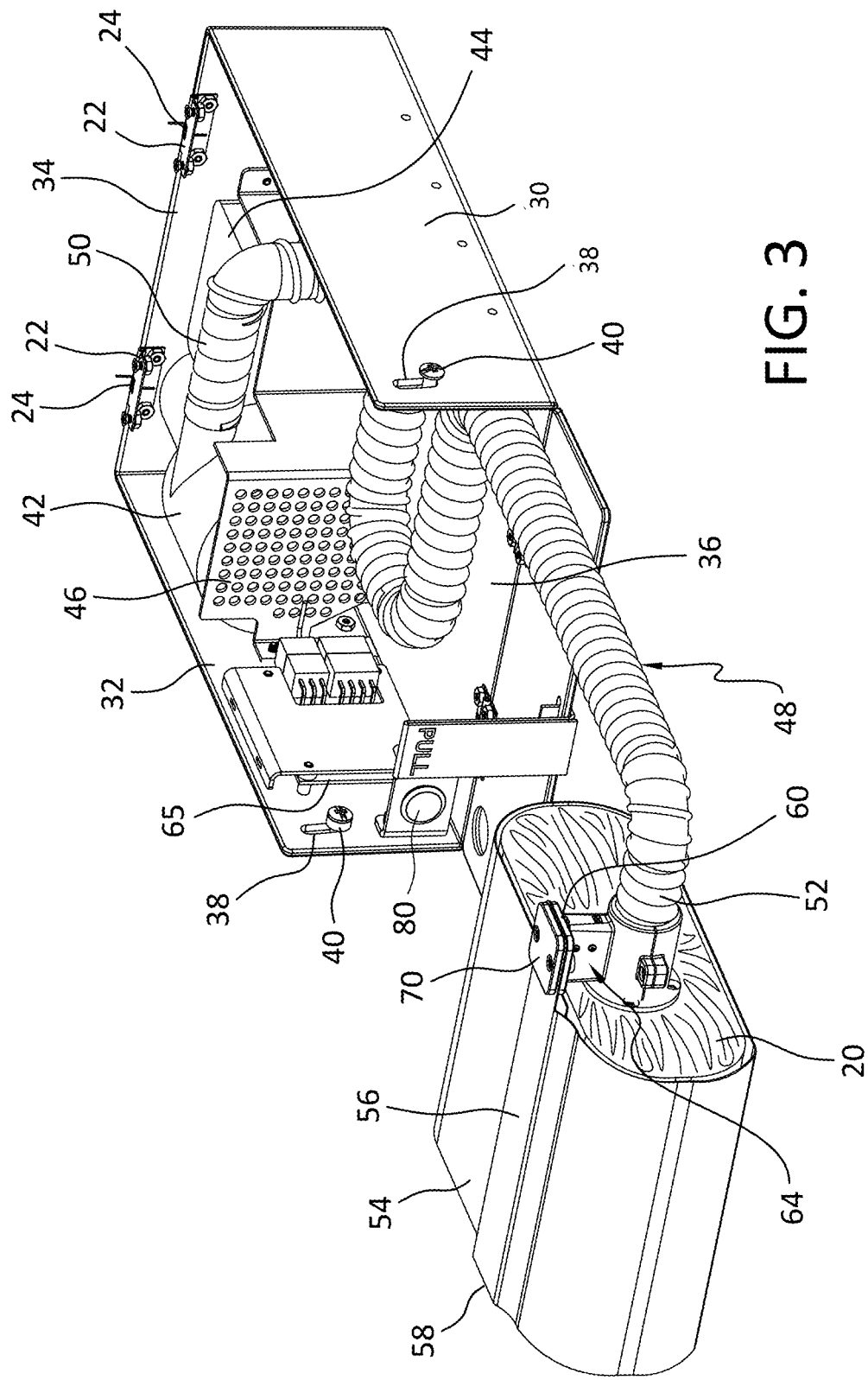
FIG. 3 is a perspective view of the EVAS device, with the front wall of the housing removed to show the components of the device inside.

Referring to FIG. 3, the front wall 6 is attached to the housing 4 with hinges 22, which may include springs 24 (see FIG. 2 for the springs 16) biased to move the front wall 6 to enlarge or widen the opening 18 when the strap 10 is released. The housing 4 includes side walls 30, 32 and 34, and a base wall 36. The side walls 30 and 32 include respective arcuate slots 38 for loosely receiving respective bolts 40, which are also attached to the side walls 26 and 28 of the front wall 6. The bolts 40 advantageously secure the front wall 6 to the side walls 30 and 32 but allow the front wall 6 to move about the hinges 22. The slots 38 and the bolts 40 allow the front wall 6 to move away from the base wall 36, thereby expanding the internal volume of the housing and widening or enlarging the opening 18 when the cover 8 is released. The side walls 26 and 28 of the front wall 6 overlie the side walls 30 and 32 of the housing throughout the extent of motion of the front wall 6, advantageously keeping the sides of the housing closed so as to keep the inflatable vision unit 20 and the hose 48 contained in the housing when the housing expands.

A blower 42 and battery 44 are operably attached to the base wall 36 and the side walls 32 and 34. A filter is disposed behind a perforated plate 46. The filter is used to clean the ambient air before being forced into the inflatable vision unit 20. A hose or tubing 48 has one end portion 50 being operably attached to the outlet of the blower 42 and another end portion 52 being operably attached to the inflatable vision unit 20. The end portion 52 is operably attached to the inflatable vision unit 20, shown folded and wrapped in a removable wrapper or sheet 54. The wrapper 54 is a sheet with overlapping end portions when wrapped around the inflatable vision unit 20. An overlying end portion 56 is removably attached to an underlying end portion 58 (not shown) with VELCRO fastener or other standard fastener to keep the inflatable vision unit 20 in its deflated and folded configuration. The overlapping end portion 56 includes an extended portion 60, which is operably attached to a removable member 62 of a switch 64.

Figure 4:
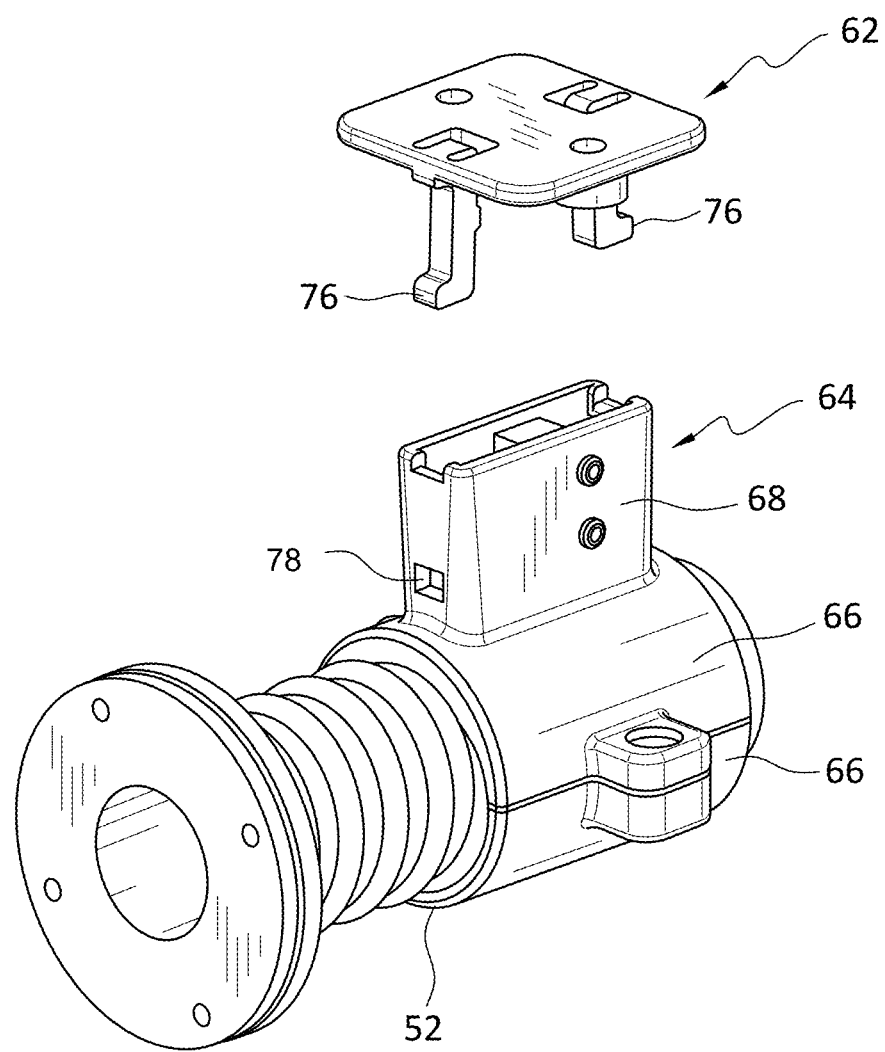
FIG. 4 is a perspective view of a switch attached to an end portion of the hose of the device.

Referring to FIG. 4, the switch 64 is operably attached to the end portion 52 with a pair of clamps 66. The inflatable vision unit 20 is not shown for clarity. The rest of the hose 48 is also not shown. The switch 64 may be OFF when the member 62 is received inside a switch housing 68 and ON when the member 62 is removed from the switch housing 68. The member 62 is operably attached to the extended portion 60 of the overlying end portion 56 of the wrapper 54. A plate member 70 sandwiches the extended portion 60 with the removable member 62. The switch 64 disclosed in U.S. Pat. No. 5,947,415, may be used. The switch 64 may be used to send a signal to a controller 65 to operate the blower 42.

The switch 64 may be a magnetic reed switch, which may be normally open and then closed when a permanent magnet is moved away. In this regard, the removable member 62 may include the permanent magnet that closes or opens the reed switch when separated from the housing 68. The ON or OFF state of the switch may be used to send a signal to a controller to operate the blower, either turning the blower on or off.

The switch 64 may also be a standard switch that completes a circuit to deliver power to the blower when in the closed position. In this regard, the member 62 when received inside the housing 68 is effective to keep the poles of the switch apart, and when the member 62 is removed, the poles come together to complete the circuit.

The switch 64 may also be a proximity sensor wherein the removable member 62 when inside the housing 68 provides an output from the sensor to keep the blower off, and when the removable member 62 is removed from the housing 68, the sensor provides an output that signals the blower to turn on.

The member 62 includes tab portions 76 which are received in respective holes 78 in the switch housing 68. The tab portions 76 advantageously provide a secure attachment of the member 62 in the switch housing 68 until removed by the user. Inadvertent removal of the member 62 is advantageously minimized.

Figure 5:
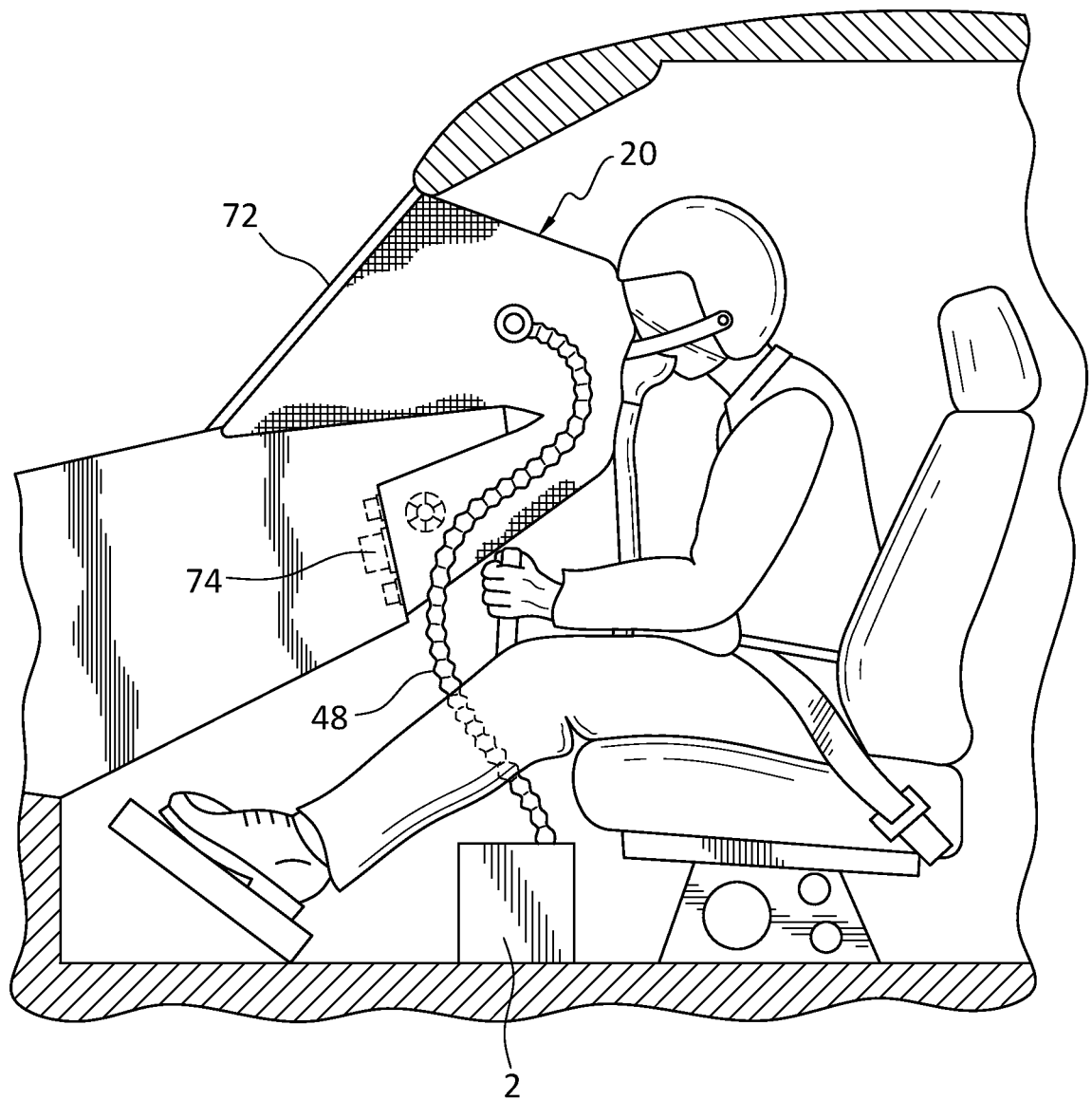
FIG. 5 is a schematic side view of an aircraft cockpit with the inflatable vision unit of the EVAS device shown expanded and deployed during a smoke emergency.

The inflatable vision unit 20 is folded and retained inside the wrapper 54 until the user is ready to deploy the unit. When smoke starts to develop inside the cockpit, the pilot will release the strap 10 from the housing 4, causing the cover 8 to automatically open from the urging of the springs 16 in the hinges 14. The wrapper 54 with the inflatable vision unit 20 then becomes visible. The opening 18 becomes wider or larger and the volume of the housing near the opening 18 becomes larger as the springs 24 urge the front wall 6 to move away from the base wall 36. The slots 38 advantageously provide a travel limit for the front wall 6. With the wider or larger opening and the expanded volume of the housing near the opening, the pilot can easily grasp the wrapper 54 and place it on the instrument panel to get ready to deploy. When smoke continues to develop and becomes denser, the pilot unwraps the inflatable vision unit 20 by separating the overlying end portion 56 from the underlying end portion 58 of the wrapper 54. The action of lifting the overlying end portion 56 removes the member 62 from the housing 68, thereby activating the switch 64 and turning on the blower 42. The blower 42 inflates the inflatable vision unit 20 with filtered ambient air, which is then positioned against the windshield 72 and the instrument panel 74 to allow the pilot to see through the smoke, as shown in FIG. 5.

The inflatable vision unit 20 is well known in the art. It comprises an enclosure when inflated with front and rear clear panels to allow the user to see through the enclosure. The front panel allows light from a visual source of information to reach the user whose face is pressed against the rear panel. Sources of visual information may include the outside environment and the instrument panel in the cockpit. The enclosure displaces the vision obscuring smoke between the front and the rear panels. An example of the inflatable vision unit is disclosed in U.S. Pat. No. 5,947,415, incorporated herein by reference.

The blower 42 advantageously stays OFF until the pilot decides to deploy the inflatable vision unit 20. The switch 64 stays OFF until the pilot unwraps the inflatable vision unit 20, after having taken the inflatable vision unit 20 out of the housing 4 and getting it ready by placing the inflatable vision unit 20 (while still in the wrapper 54) on the glareshield. In case the smoke emergency fails to develop further into a serious situation where the pilot's vision is severely obscured, the pilot can continue to operate the aircraft without inflating the inflatable vision unit 20, thus saving the effort of deflating the inflatable unit 20 and putting it out of the way.

Figure 6:
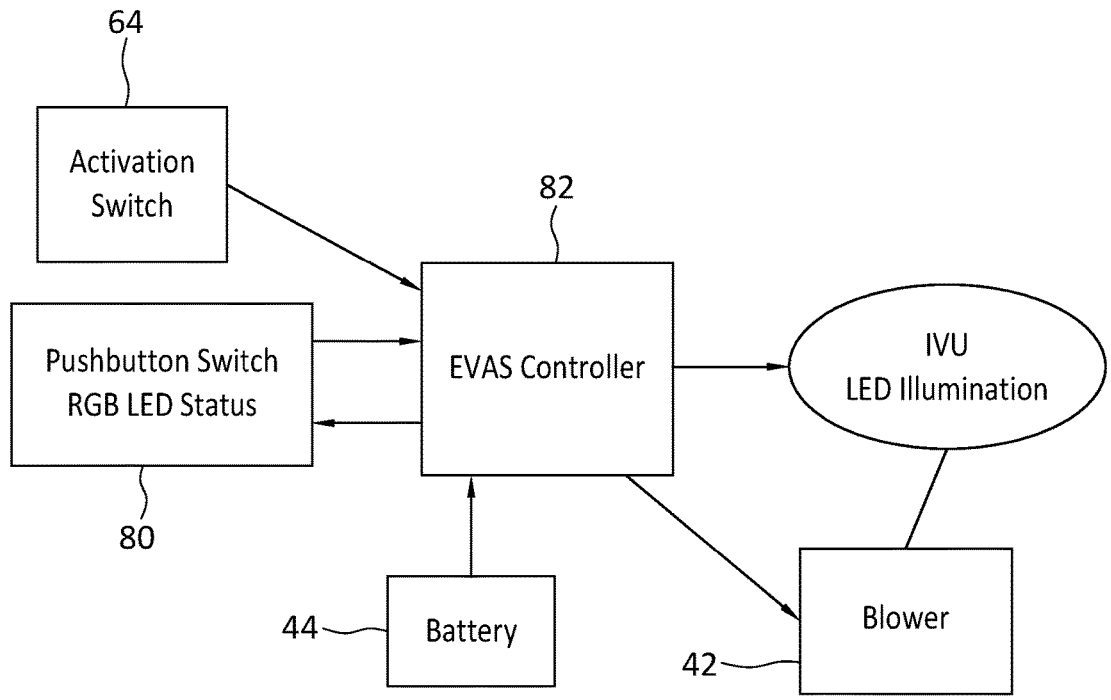
FIG. 6 is a functional block diagram of a system for controlling the blower of the EVAS device.

Referring to FIG. 6, the EVAS device controller 82 is a printed circuit board consisting of a microcontroller and additional circuitry for monitoring and controlling the EVAS device system. The microcontroller is programmed to monitor voltage of the battery 44, turn on or off the blower 42, monitor the activation switch 64 and pushbutton switch 80 (see FIG. 3), turn on or off the IVU LED illumination, and provide status via the RGB LED.

Figure 7:
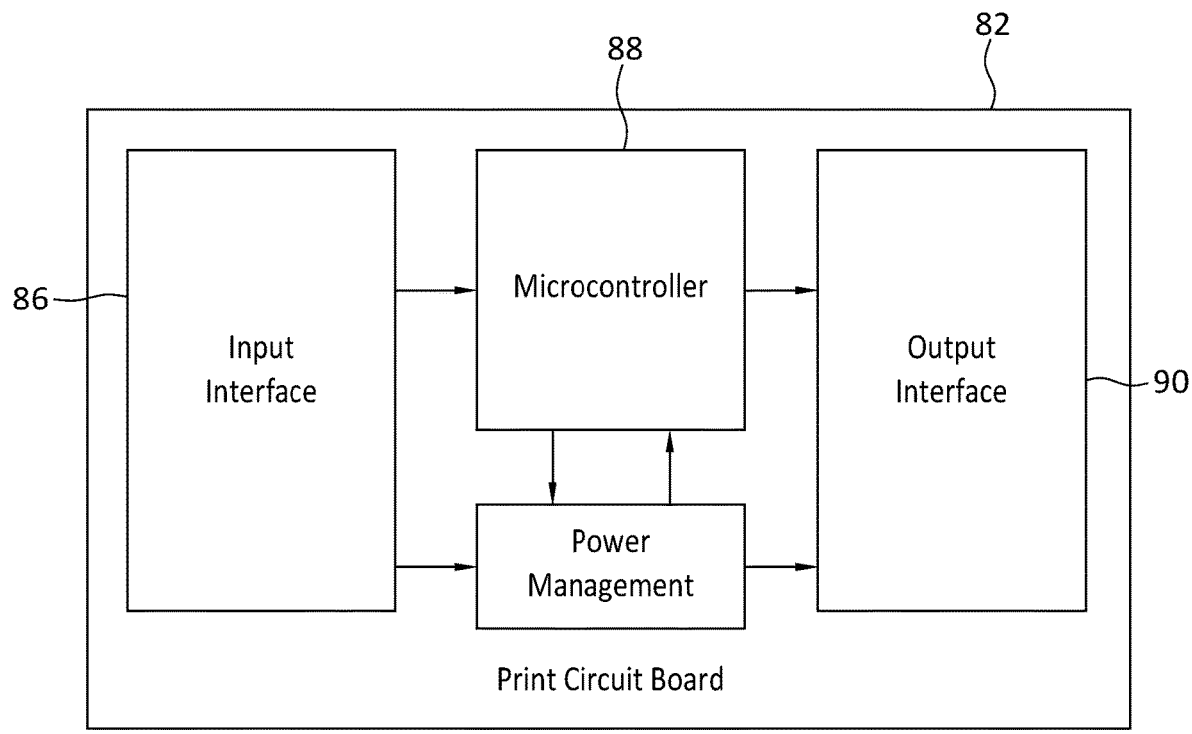
FIG. 7 is a controller block diagram showing the components of a circuit board for controlling the EVAS device.

Referring to FIG. 7, the input interface 86 accepts signals from the activation switch 64 and pushbutton switch 80. Both switches turn on power to the remaining circuits. The microcontroller 88 executes code to control the blower 42, LED illumination, and RGB LED status of the battery 44 via the output interface 90. The microcontroller also monitors the battery and controls power to the system.

Figure 8:
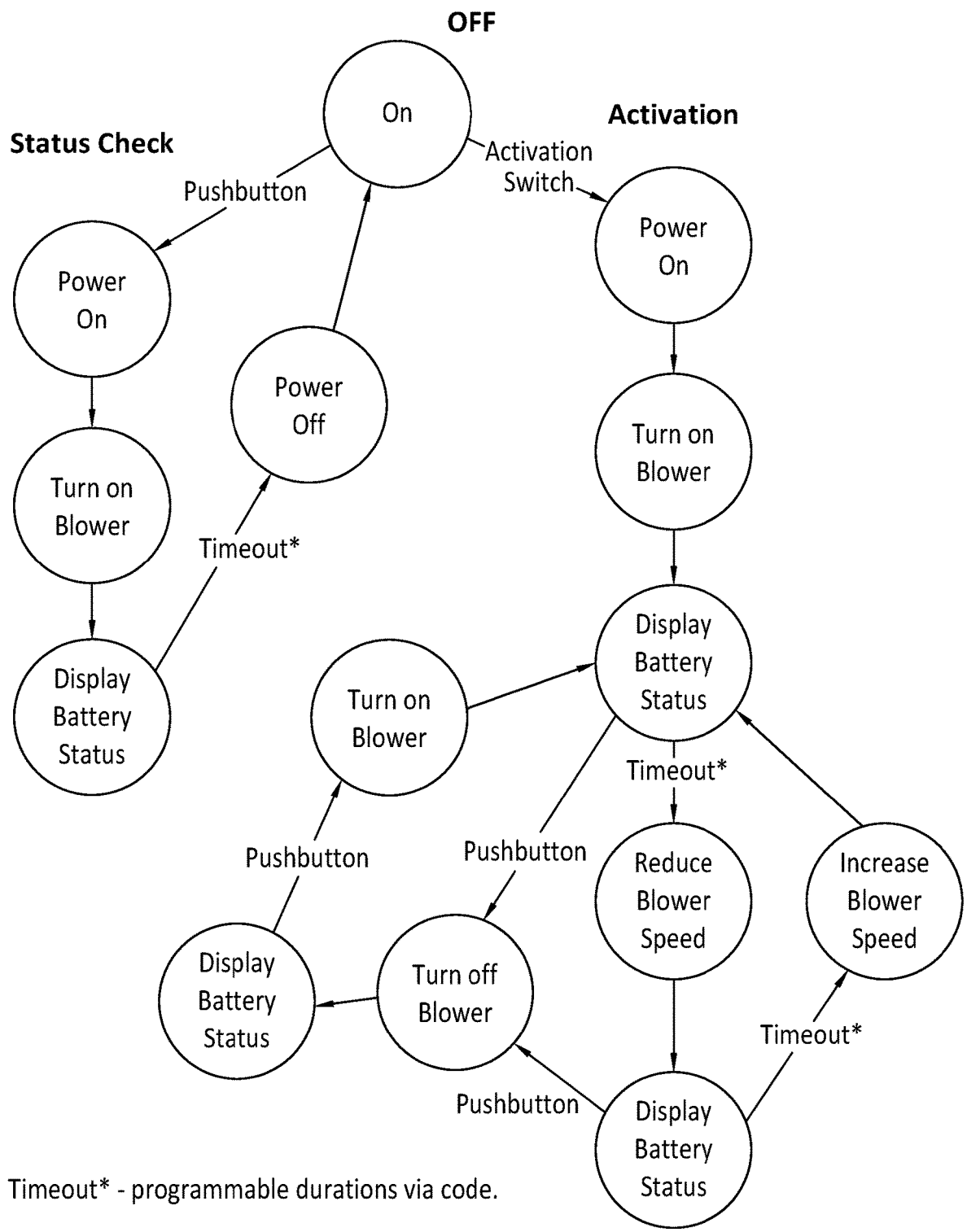
FIG. 8 is a flowchart illustrating the operation of the EVAS device.

Referring to FIG. 8, a state diagram illustrates the behavior of the system of the EVAS device of 2. A status check occurs when the pushbutton 80 is activated, causing the system to turn on the blower 42, display the battery status and after a timeout period, turn off the power.

An activation sequence occurs when the activation switch 64 is activated, causing the blower 42 to run, display the battery status, and after a timeout, reduce the blower speed when the vision unit 20 is fully inflated. After another timeout, the blower speed is increased to maintain the inflation of the vision unit 20 and again display the battery status. After the vision unit 20 is no longer needed, the pushbutton 80 is pressed to turn off the blower 42.

Although the present invention has been described in the environment of an aircraft cockpit, it should be understood that it would be equally applicable to other settings, such as in a submarine control station, a nuclear power plant control room or any other environments where the need exists for an operator to continue to operate in case of smoke in the room that obliterates the visibility between the operator and the control panel. For example, in FIG. 5, the instrument or control panel 74 may be disposed in an operator station within a control room in a submarine, nuclear power plant, or other critical areas. In this case, to continue to operate, the operator must have visual access to the instrument or control panel in case smoke invades the operator station.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

I claim:

1. An emergency vision system, comprising:
a) a housing;
b) an inflatable enclosure having an inflated state and a deflated state, the inflatable enclosure in the deflated state being disposed in the housing;
c) a blower disposed in the housing;
d) a hose with a first end attached to the blower and a second end attached to the inflatable enclosure; and
e) a first switch entirely disposed at the second end of the hose, the first switch for operating the blower.

2. The emergency vision system as in claim 1, wherein a wrapper is wrapped around the inflatable enclosure.

3. The emergency vision system as in claim 2, wherein:
a) the wrapper is operatively associated with the first switch such that opening the wrapper causes the first switch to activate.

4. The emergency vision system as in claim 2, wherein the wrapper includes a first end portion overlapping a second end portion.

5. The emergency vision system as in claim 4, wherein the first switch is operably associated with the first end portion.

6. The emergency vision system as in claim 5, wherein:
a) the first switch includes a switch housing and a removable member disposed in the first switch housing; and
b) the removable member when separated from the first switch housing is configured to activate the first switch.

7. The emergency vision system as in claim 6, wherein:
a) the removable member is operably attached to the first end portion of the wrapper.

8. The emergency vision system as in claim 7, wherein the first switch housing is attached to the second end of the hose.

9. The emergency vision system as in claim 1, wherein:
a) the housing includes an opening for access to the inflatable enclosure;

b) the opening has a smaller opening when closed and a larger opening when open; and
c) a cover for closing the opening.

10. The emergency vision system as in claim 9, wherein:
a) the housing includes a hinged wall defining one side of the opening; and
b) the hinged wall is configured to expand an internal volume of the housing when the cover is lifted from the opening.

11. The emergency vision system as in claim 9, wherein the hinged wall is spring loaded to move away from the opening when the cover is lifted from the opening.

12. The emergency vision system as in claim 9, wherein:
a) the housing includes a front wall with a first edge portion and a second edge portion; and
b) the first edge portion defines a portion of the opening; and
c) the second edge portion includes hinges attached to the housing.

13. The emergency vision system as in claim 12, wherein the hinges are spring loaded biased to move the front wall to enlarge the opening.

14. The emergency vision system as in claim 13, wherein the first edge portion includes a stop to limit extent of movement by the front wall about the hinges.

15. The emergency vision system as in claim 13, wherein:
a) the front wall is U-shaped with a first side wall and a second side wall; and
b) the housing includes a first slot and a second slot;
c) the first side wall includes a first pin slidable in the first slot; and
d) the second side wall includes a second pin slidable in the second slot.

16. The emergency vision system as in claim 15, wherein the first slot and the second slot are arcuate.

17. The emergency vision system as in claim 9, wherein the cover includes hinges attached to the housing.

18. The emergency vision system as in claim 17, wherein the hinges include springs biased to lift the cover from the opening.

19. The emergency vision system as in claim 9, wherein the cover includes a strap removably attached to the housing.

20. The emergency vision system as in claim 19, wherein:
a) the housing includes a hinged side defining one side of the opening; and
b) the strap when released from the housing causes the hinged side to enlarge the opening.

21. The emergency vision system as in claim 9, wherein a wrapper is disposed around the inflatable enclosure when deflated.

22. The emergency vision system as in claim 1, and further comprising a second switch for turning off the blower after activation by the first switch.

23. The emergency vision system as in claim 22, wherein the second switch is operably attached to the housing.

24. An emergency vision system, comprising:
a) a housing;
b) an inflatable enclosure having an inflated state and a deflated state, the inflatable enclosure in the deflated state being disposed in the housing;
c) a blower disposed in the housing;
d) a hose with a first end attached to the blower and a second end attached to the inflatable enclosure;
e) a switch disposed at the second end of the hose, the switch for operating the blower;
f) a wrapper is wrapped around the inflatable enclosure; and g) the wrapper is operatively associated with the switch such that opening the wrapper causes the switch to activate.

25. An emergency vision system, comprising:
a) a housing;
b) an inflatable enclosure having an inflated state and a deflated state, the inflatable enclosure in the deflated state being disposed in the housing;
c) a blower disposed in the housing;
d) a hose with a first end attached to the blower and a second end attached to the inflatable enclosure; and
e) a switch disposed at the second end for operating the blower; and
f) a wrapper is wrapped around the inflatable enclosure, the wrapper including a first end portion overlapping a second end portion.

* * * * *